Aug. 14, 1956  R. J. BLOCK ET AL  2,758,965

ELECTRODIALYSIS OF SOLUTIONS

Filed Jan. 20, 1954

INVENTORS
RICHARD J. BLOCK,
WINSTON H. WINGERD,
and RICHARD HENDERSON

BY Robert Calvert
ATTORNEY

United States Patent Office 2,758,965
Patented Aug. 14, 1956

2,758,965

ELECTRODIALYSIS OF SOLUTIONS

Richard J. Block, Scarsdale, Winston Harold Wingerd, Yonkers, and Richard Henderson, Chappaqua, N. Y., assignors to The Borden Company, a corporation of New Jersey Application January 20, 1954, Serial No. 405,084

2 Claims. (Cl. 204—180)

This invention relates to a process and apparatus for electrodialysis of solutions containing salts to be removed and proteins or other material of high molecular weight. Examples of such solutions that we use are whey, blood serum, latex, viruses, and vegetable extracts.

The invention is particularly useful in the manufacture of lactose and, for that reason, will be first illustrated by description in connection with such use.

A conventional process of preparing lactose involves mixing calcium hydroxide with whey, to precipitate phosphate present in the whey, separating the calcium phosphate by filtration, coagulating the heat-coagulable proteins by heating, filtering out the protein so coagulated, concentrating the resulting filtrate by evaporation to a relatively small volume, and cooling the hot solution of lactose so formed, to cause crystallization of the lactose. Yields of lactose by this method are of the order of 60% of the amount present in the whey originally used. Also the lactose recovered requires purification by decolorization and recrystallization.

In our process, by contrast, we obtain up to 90% or higher yields of the lactose and purity on one crystallization that meets the U. S. P. requirements for lactose of pharmaceutical grade.

Our process as applied to lactose manufacture involves electrodialysis of whey so that ions move from but not into the whey, the electrodialysis being followed by separation of lactose from the thus deionized whey.

When we attempted to use only the latest techniques of electrodialysis for this purpose, we obtained unsatisfactory results. The useful life for the ion exchange membranes was unexpectedly short. We did not obtain the necessary deionization with a reasonable wattage consumption or produce a whey from which lactose could be crystallized with good yield. We overcame these difficulties by changing the procedure to that described herein.

Briefly stated, the invention comprises the electrodialysis of whey with ion selective permeable membranes and of solutions containing non-dialyzable material with such membranes guarded by dialysis membranes that are substantially non-selective as to anions or cations. The invention comprises also evaporating the resulting deproteinized and deionized whey, to form a hot concentrated solution of lactose, and then cooling the solution, to cause crystallization of the lactose.

The invention will be illustrated by description in connection with the attached drawings to which reference is made.

Figure 1:
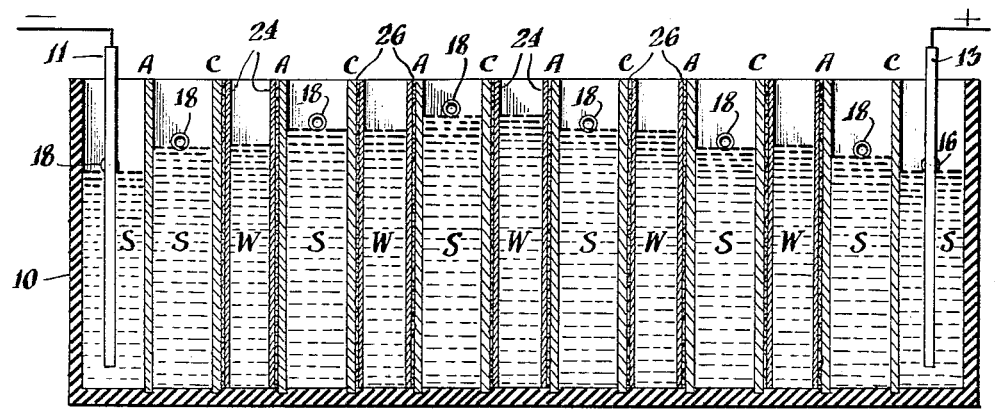
Fig. 1 shows diagrammatically a side sectional view of a simplified form of electrodialysis equipment.

The figures are in part diagrammatic.

The equipment includes tank 10 with a non-conducting or insulated wall, a plurality of cells W and S arranged in series between the anode 12 and cathode 14, alternate ones of these cells W containing the deproteinized whey and the other cells S containing a saline solution that is necessarily a conductor of electricity. In a commercial installation, the number of individual cells may be 20–100 or so. Pipes or tubes 16 and 18, with conventional fittings (not shown), provide for flow of whey and saline solution, respectively, from places of feed of the two solutions in cells midway of the assembly towards the electrodes, where the solutions may be withdrawn through valved outlets 20 for the deionized whey and 22 for the saline of concentration increased by the electrodialysis. The cathode 11 is suitably platinum, the anode 13 carbon sticks or stainless steel.

Figure 2:
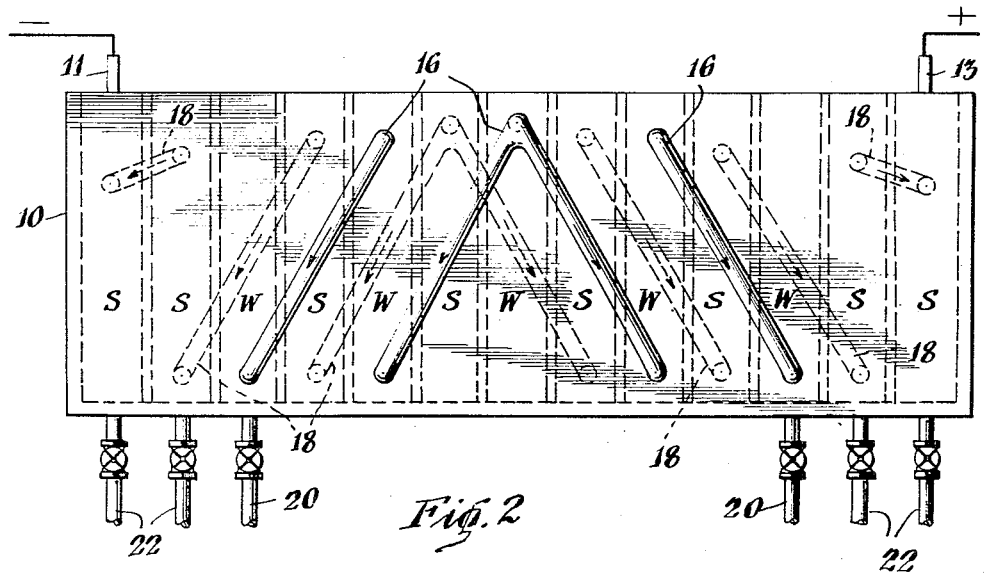
Fig. 2 is a side view of a similar unit.

The side walls of these successive cells, that is, the sides turned towards the anode or cathode, consist essentially of ion permeable membranes with suitable mechanical supports that are conventional and not shown. On the cation side of each whey cell W, there is placed such a membrane C that passes cations but not anions; on the anode side of each such cell W is a membrane A that passes anions but not cations. On the sides of the salt cells S, the positions of the exchangers C and A are reversed with respect to the direction of flow of the current, all as illustrated in Figs. 1 and 2. Semi-permeable membranes 24 spaced from the A and C membranes in the whey cells, as by plastic mesh 26, protect the membranes A and C against fouling under severe conditions of operation.

These membranes 24 are dispensed with when proteins or materials of high molecular weight are not present in the liquor being processed.

The operation of the electrodialyzer should be largely evident from the description of it that has been given.

As direct current passes through the cell, migration of the cations to the left is promoted, that is, towards the cathode 14. When a cation reaches a membrane A forming the anion side wall of a whey cell, this side wall, being one that passes only anions, rejects the cation. This prevents migration of the cation into the next whey cell.

In like manner, anions, which under the electrical potential, move to the right in the figures, that is, towards the anode 12, are stopped by membranes C which pass only cations. Entrance of ions into the whey from both sides of the cell is thus prevented.

By contrast, ions in the whey cells are free to move towards and into the adjacent cells of the aqueous saline solutions.

As a result of this operation the whey comes to be deionized. The ions removed from the whey concentrate in the adjacent saline solutions.

When these aqueous saline solutions become saturated or practically saturated with ions from the whey, the solutions may be replaced by fresh solution of a salt and may be evaporated to a dry feed supplement including the mineral matter of whey.

Unless the semipermeable membranes 24 are employed, it is necessary for the successful electrodialysis, that the whey be treated in advance to remove substantially all protein normally present in the whey. We effect this pretreatment of the whey by precipitation and filtering steps, "filtering" including filtration proper, settling and decantation, and centrifuging or a combination of these techniques. Thus, we precipitate the protein to advantage by adding a solution of a ferric salt, either actual or potential, in moderate excess, and filtering off the resulting precipitate, as described in the copending application of Block and Bolling, Serial No. 285,802, filed May 2, 1952. The thus treated whey is negative in the test for protein by the standard trichloracetic acid precipitation method. In an alternative procedure, we precipitate the protein by boiling to cause coagulation of the lactalbumin and subsequently filtering off the lactalbumin, the casein component of the milk having been previously removed in the conventional production of the whey.

The operation is materially improved and fouling of membranes by colloids or the like is decreased by use of the semi-permeable membranes 24. These are membranes that permit diffusion therethrough of crystalloids but not colloids. Examples are cellophane, parchment, and collodion, all in the form of film or thin sheeting. Such membranes are known to be ion-non-selective, that is they pass both anions and cations freely during the electrodialysis, although not necessarily at exactly the same rates.

As to materials used, the whey may be either whey from the manufacture of cheese or whey from the acid precipitation of casein as in the manufacture of industrial or edible casein. The whey of either kind must be pretreated as stated to lower the protein content before subjecting the whey to electrodialysis. The whey may be concentrated in advance, as by evaporation, but not to a concentration as high as that at which lactose crystallizes out.

The conducting salt solution, which fills the alternating cells in the electrodialyzer, may be one of those that is usual in electrodialysis operations. Thus the saline cells may be primed at first with sufficient sodium chloride, sodium sulfate or the corresponding potassium salts dissolved in water in proportion to give electrical conductance. As the electrodialysis proceeds, ions from the whey accumulate in the saline solutions and increase the conductance of those solutions.

The loss of ions from the whey cells leads eventually to decreased conductivity of the alternating cells containing whey and to decreased amperage through the system. The electrodialysis is complete when the change with time in ion content of the whey cells becomes negligible and the electrical conductivity of the whey cells falls to a low and substantially steady value. Such complete desalting is unnecessary for our purpose. We discontinue the electrodialysis when the ion concentration in the whey no longer interferes with the recovery of lactose, that is, is no more than 20% of the original concentration in the whey.

The cation passing material or cation permeable side wall of the whey cells is one that, in contact with water, ionizes to leave a negatively charged insoluble residue constituting the membrane. The anion passing material is one that, under the same conditions, leaves a positively charged residue. Ion permeable materials that have been proposed as the "sieves" for desalting water by electrodialysis are satisfactory for the present purpose. Examples of materials that are ion selective, meet the requirements, illustrate the class of cation passing and anion passing materials to use, and are obtainable in the form of films or membranes for the present use are the "Amberplex" anion and cation passing resins.

The particular material used in the selectively ion-permeable membranes is not a part of the invention. The exchanger, it should be said, is in the form of a powder embedded in a matrix of plastic such as polyoxyethylene, polyisobutylene, rubber in cured condition, and vinylchloride polymers and copolymers.

Examples of membranes that illustrate the class to be used in the cation passing membranes are those described in Canadian Patent 493,562 issued to Bodamer June 9, 1953. They include the reaction product of (1) 5% divinylbenzene and 95% methacrylic acid according to U. S. Patent 2,340,111, (2) 90 styrene and 10 divinylbenzene according to U. S. Patent 2,366,007, or (3) 10 divinylbenzene and 90 methacrylic acid.

Anion passing membranes that may be used are those described in Canadian Patent 493,563 issued to Bodamer on June 9, 1953. They include matrices of the kind described, and, embedded therein, anion exchangers including the products of aminating, with (1) trimethylamine, with (2) dimethylaminoethanol, or with (3) diethylene triamine, a chloromethylated copolymer of 94% styrene and 6% divinylbenzene.

The removal of the residual protein is effected to advantage by the precipitation with ferric iron in moderate excess. This removal of the residual protein prevents the protein which otherwise would be present in the whey from collecting on the ion permeable membranes and interfering with the ion sieving action.

When iron in excess has been introduced, to precipitate residual protein in the whey, or when the whey for other reason contains appreciable ferric iron, the iron is reduced to the ferrous state before the electrodialysis is effected. This reduction is effected as described in the said Block and Bolling application, ordinarily by adding sodium dithionite in amount at least equivalent to the ferric iron. This reduction of the iron to ferrous condition destroys the chelate of ferric iron with lactic acid and with whey polypeptides or residual proteins which, if present, protects or immobilizes the iron ions against removal by electrodialysis. The reduction increases the proportion of the iron removed in the subsequent electrodialysis.

The purity of the lactose obtained by one crystallization improves with the more nearly complete deionization of the whey from which the lactose is made. When at least 90% of the original ion content has been separated from the whey, then the lactose finally made meets U. S. P. requirements on one crystallization.

We use to advantage a voltage which is low at the start as, for example, not above about 80 volts, and then gradually builds up to 100–150 volts or so near the end of the electrodialysis. With the initial low voltage and the gradual increase, we obtain a better recovery of lactose averaging about 4% of the whey in the original unconcentrated condition. Using the low voltage at the start, we also avoid the formation of a precipitate high in iron and lactose which otherwise forms during the electrodialysis, when the whey used is originally in concentrated form and iron has been used in precipitating residual protein. Also the use of the initially low voltage decreases the temperature of the cells during electrolysis to about 40° C., whereas standard city current of 110 volts applied from the start raises the temperature of the cells to about 70°.

When the iron precipitation method of deproteinizing whey is used, then the pH of the whey at the time of electrodialysis should be between 4.5 and 2. At higher pHs, the iron is not removed satisfactorily by the electrodialysis. At pHs substantially below 2, there is loss of efficiency in the electrodialysis, excessive acidities requiring objectionably large power consumption for a given amount of ion separation.

The invention will be further illustrated by description in connection with the following specific examples of the practice of it. Proportions here and elsewhere herein are expressed as parts by weight.

Example 1

The electrodialysis was effected in an apparatus containing two electrode compartments, 8 whey cells separated by the C and A membranes as illustrated, and 9 alternating cells containing salines, mostly the minerals from whey of previous runs.

The whey used was that which had been separated in the manufacture of cheese.

The residual protein of the whey (0.6 part) was precipitated by the addition of a moderate excess of ferric chloride, as described in the said application of Block and Bolling. After the filtering out of the protein separated by the ferric iron, the whey, which now showed no protein by the trichloracetic acid test for protein, was treated with a slight excess of sodium dithionate to reduce remaining ferric iron to the ferrous condition as indicated by the disappearance of the thiocyanate color for $Fe^{+++}$.

The deproteinized whey with the remaining iron content thereof in the ferrous form was then electrodialyzed. The electrodialysis was continued until the ion content of the whey became 5% of the original.

The thus pretreated and then electrodialyzed whey was then evaporated to form a hot, concentrated solution of the lactose therein, filtered to remove insolubles, if any, present at this stage, and then cooled to crystallized lactose.

The lactose so obtained met U. S. P. specifications.

In a modification of this example, directed to further lowering of the ash content, the electrodialyzed whey was subjected to passage over a cation exchanger. A non-toxic, granular cation exchanger is satisfactory. In this example we used Amberlite IR-112 and then passed the solution over an anion exchange resin Duolite A-4 (any non-toxic, granular anion exchange resin would do), the rate of flow and amount of solution used in proportion to the anion exchanger causing adjustment of the pH to 6.8.

The effluent from the exchanger treatments was then evaporated to dryness. The solid thus obtained had an ash content of less than 0.19% and a nitrogen content of 0.24%.

In other runs according to this example, with other wheys, the combination of the deproteinization of the whey, the dithionate reduction of remaining ferric iron, and the ion exchanger treatment of the electrodialyzed material lowered the nitrogen and ash content of the resulting lactose each to less than 0.1%.

We consider that the dithionate treatment destroys the ferric iron and lactic acid and other chelates which otherwise interfere with the proper operation of the iron removal by electrodialysis.

*Example 2*

The general procedure of Example 1 was followed except that the whey used was a cheese whey that had been concentrated to half the original volume.

Satisfactory desalting of the whey and subsequently a good yield of lactose were obtained.

*Example 3*

Whey deproteinized by ferric iron precipitation of the residual protein therefrom was concentrated to 2.6 times its original volume and subjected to the dithionate reduction and then to electrodialysis as described with a voltage of about 110 throughout. The initial amperage passing through the electrodialyzer was 49 amperes per sq. ft. of cross sectional area of the electrodialyzer. The final amperage was approximately one-fiftieth of this current density. The time of the electrodialysis was 160 minutes. The power consumption in this case was approximately 0.3 watt hours per liter of the whey used. The lactose content of the deionized whey was 3.3%.

The lactose, obtained by concentrating the deionized whey by evaporation had an ash content of 0.03% and a nitrogen content of 0.25%.

*Example 4*

In this example, the whey is moved from whey cell to whey cell during the electrodialysis and the saline solution in the alternating cells is moved from saline cell to saline cell, in the opposite or in the same direction with the whey, so as to give continuous operation. The result is countercurrent or concurrent dialysis.

Also, the semi-permeable membranes 24, in this case cellophane sheeting of thickness 0.001–0.002 inch, is used, the spacing plastic mesh 26 being electrically non-conducting strands of nylon, polyvinyl chloride resin, or polyacrylonitrile woven into a fabric with open mesh construction resembling cheese cloth. The effect of the thus spaced semi-permeable membranes is to decrease deposition of residual protein or other colloids in the membranes A and C.

In all of the examples, circulation within the several cells may be and suitably is produced by conventional means, such as agitators or by baffles placed between the inlet and outlet for the fluid for each cell.

Current consumption is decreased by arrangement of a number of the electrodialyzer units in parallel, so that within each unit there is a multiplicity of the cells in series and such unit, in turn, is in a parallel circuit with like units.

The whey used in the procedure of any of the above examples may be acid whey or cheese whey. A summary of results obtained with these two types of whey in the condition of having been previously deproteinized in terms of the ash and protein content of the solids content of the processed whey is tabulated below. In each case the whey used had been deproteinized by precipitation with an excess of a water soluble ferric salt. In some cases the whey had then been subjected to the sodium thionate reduction of ferric iron. In other cases the whey had been not only deproteinized and then subjected to the dithionate reduction but also subjected to cation and then to anion exchanger treatment of the deionized whey, for removal of additional ions.

The results follow.

| Kind of whey | Treatment | Resulting whey solids | |
|---|---|---|---|
| | | Percent ash | Percent nitrogen |
| Acid whey | Deproteinized (1) | 0.24 | 0.33 |
| Cheese whey | Deproteinized (1) | 0.65 | 0.34 |
| Acid whey | (1) + Dithionate (2) | 0.15 | |
| Cheese whey | (1) + Dithionate (2) | 0.40 | 0.34 |
| Cheese whey | (1) + (2) + Ion exchangers | 0.09 | 0.09 |

The treatments shown in the tabulation were applied to the whey in advance of the electrodialysis except for the "ion exchangers" which were used after the electrodialysis.

The ion exchangers with their beneficial effect upon the final ash and nitrogen content of the electrodialyzed solids may be omitted when the lactose, made by concentrating and then cooling the treated whey, is to be recrystallized. When the exchangers have been used, on the other hand, the ash content of the whey solids is so low that the whey may be evaporated to dryness and the whole residue accepted as lactose of quality satisfactory for the market.

Milk may be used in place of whey in the process and examples of the invention. When milk is used, however, the casein precipitates in the whey cells. Special means, such as addition of alkali in amount to establish the pH at around 6.8-7 at the end of the electrodialysis, must be used if the precipitate is to be redissolved.

It will be understood that it is intended to cover all changes and modifications of the examples of the invention herein chosen for the purpose of illustration which do not constitute departures from the spirit and scope of the invention.

What we claim is:

1. In the electrodialysis of solutions, containing non-dialyzable materials of high molecular weight and also salts by the process including passage of an electrical current between an anode and cathode and through cells containing the solution to be dialyzed and a conducting liquid to receive the ions removed from the said solution, the said solution and liquid being contained, in alternation, within the said cells and the cells having walls of membranes selectively permeable to cations and opposed walls selectively permeable to anions, the improvement which comprises effecting the electrodialysis through semi-permeable ion-non-selective dialyzing membranes disposed in the said solution in front of the anion and cation passing membranes and between the position of introduction of the solution and the anion and cation passing membranes.

2. Apparatus for the electrodialysis of aqueous solutions containing a salt to be removed and materials of high molecular weight to be desalted, the apparatus including alternating cells for the said solution and a saline liquid conductor of electricity, walls of the cells for the solution that are anion passing only on the side towards the anode and cation passing only on the side towards the cathode, the said walls of the two kinds forming partitions between the cells for the said solutions and the cells for the saline liquid, and membranes that are ion-non-selective and permeable to the salts but not to the said material of high molecular weight between the positions of introduction of the said solution to the several cells therefor and the anion and cation passing walls in those cells.

References Cited in the file of this patent

UNITED STATES PATENTS

| | | |
|---|---|---|
| 2,502,614 | Zender | Apr. 4, 1950 |

FOREIGN PATENTS

| | | |
|---|---|---|
| 694,223 | Great Britain | July 15, 1953 |
| 248,998 | Great Britain | Mar. 18, 1926 |
| 692,683 | Great Britain | June 10, 1953 |